Figure 1:
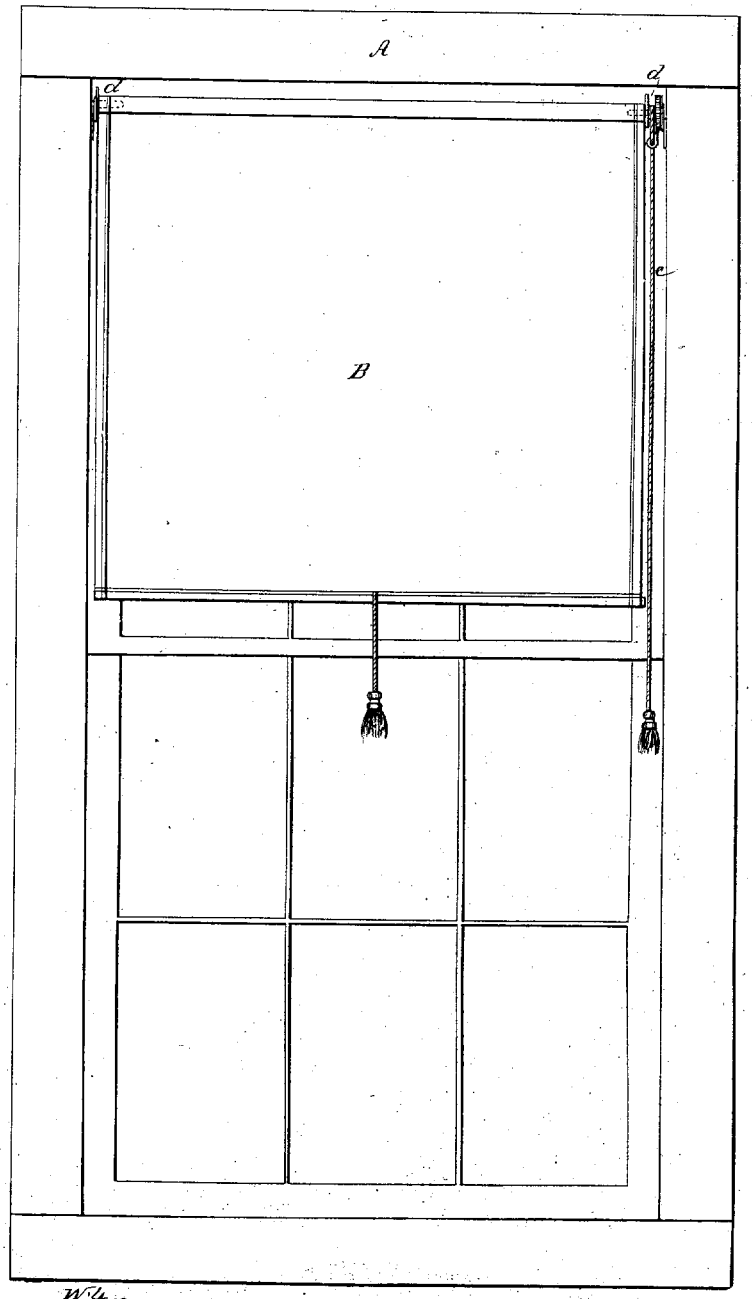

L. White,

Curtain Fixture.

No. 965. Reissued May 22, 1860.

Witnesses:
Thos. R. Roach
R. E. Fechemacher

Inventor:
Lewis White

N. PETERS, PHOTO-LITHOGRAPHER, WASHINGTON, D. C.

UNITED STATES PATENT OFFICE.

LEWIS WHITE, OF HARTFORD, CONNECTICUT, ASSIGNOR TO S. S. PUTNAM & CO., OF ROXBURY, MASSACHUSETTS.

IMPROVEMENT IN CURTAIN-FIXTURES.

Specification forming part of Letters Patent No. 14,123, dated January 15, 1856; Reissue No. 965, dated May 22, 1860.

*To all whom it may concern:*

Be it known that I, LEWIS WHITE, of the city and county of Hartford, and State of Connecticut, have invented a new, useful, and Improved Curtain-Fixture; and I do hereby declare that the same is described and represented in the following specifications and drawings.

To enable others skilled in the art to make and use my improvements I will proceed to describe their construction and operation, referring to the drawings, in which the same letters indicate like parts in each of the figures.

Figure 2:
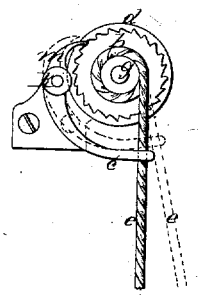
Figure 3:
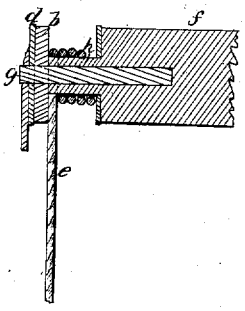
Figure 4:
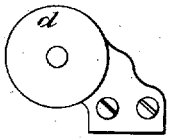

Figure 1 is an elevation of a curtain, with my improved fixture applied to it. Fig. 2 is an end elevation of the same. Fig. 3 is a longitudinal section of the fixture. Fig. 4 is one of the brackets.

I am aware that curtains have been raised by means of springs and held in the required position by a pawl and ratchet-wheel, the pawl being disengaged from the wheel when it was desired to set the curtain free by means of a lever or handle projecting from the pawl, which lever was operated by hand.

My present improvements relate particularly to curtains which are raised by means of a cord wound upon the curtain-roll, and are drawn down by hand or by a weighted tassel; and my invention consists in operating the device by which the curtain is held in the desired position by the cord which raises the curtain, the cord being so connected with the holding device that when it hangs vertically the curtain shall be retained in a fixed position, and when it is drawn at an angle it shall release the curtain and permit it to be drawn down, as will now be more fully described.

In the said drawings, A is the window-frame, to which the two brackets *d* for the pivots *g* of the curtain-roll *f* are secured. The curtain B is attached to the roll *f* in any ordinary or suitable manner. A ratchet-wheel, *b*, is fastened to the end of the roll *f*, which is reduced in size, as represented at *h*, to form a barrel to receive the cord *e*, this cord being fastened to it, and also wound around it when the curtain is drawn from the roll.

Upon a stud, *k*, projecting from one of the brackets *d*, vibrates the lever *c*, which is furnished at one end with an eye, through which the cord *e* passes, and at the other with a pawl, *m*, which engages with the teeth of the wheel *b*, Fig. 2. When the pawl is thus engaged with the wheel *b*, the curtain roll is prevented from turning, except in the direction in which it is turned to raise the curtain, which is thus retained in the position in which it is placed. When the pawl is disengaged from the wheel *b*, the curtain is left free to descend if the cord *e*, by which it is operated, be loosened up. The lever *c* is operated by the cord *e*, which passes through its end, and when this cord hangs vertically, as seen in full lines in Fig. 2, the pawl *m* engages with the wheel *b* and prevents the curtain from descending. When, however, the cord is drawn at an angle with a vertical line, as seen in dotted lines in Fig. 2, the pawl *m* is disengaged from the wheel *b*, and the curtain may be drawn down by the left hand while the right hand holds the cord.

I do not claim arresting the curtain and holding it in position by means of a pawl and ratchet-wheel, as this has been done before; but

What I claim as my invention, and desire to secure by Letters Patent, is—

Operating the lever *c*, which arrests the curtain-roll, by means of the cord which raises the curtain, whereby the curtain is held stationary when the cord hangs vertically and is set free to be raised or lowered when the cord is drawn at an angle, as set forth.

LEWIS WHITE.

Witnesses:

THOS. R. ROACH,

P. E. TESCHEMACHER.